United States Patent
Heo et al.

(10) Patent No.: US 7,077,166 B2
(45) Date of Patent: Jul. 18, 2006

(54) DRAIN HOSE FOR ELECTRICAL APPLIANCE HAVING WATER OUTLET

(75) Inventors: Seong Eun Heo, Jinju-si (KR); Dong Yoon Kim, Changwon-si (KR)

(73) Assignee: LG Electronics Inc., Seoul (KR)

(*) Notice: Subject to any disclaimer, the term of this patent is extended or adjusted under 35 U.S.C. 154(b) by 23 days.

(21) Appl. No.: 10/607,985

(22) Filed: Jun. 30, 2003

(65) Prior Publication Data

US 2004/0187947 A1 Sep. 30, 2004

(30) Foreign Application Priority Data

Mar. 26, 2003 (KR) .................. 10-2003-0018984

(51) Int. Cl.
*F16L 11/11* (2006.01)
*F16L 51/03* (2006.01)

(52) U.S. Cl. ............ 138/118; 138/121; 138/122; 138/109; 285/235

(58) Field of Classification Search ............. 138/121, 138/122, 109, DIG. 8; 285/236, 235, 295.3
See application file for complete search history.

(56) References Cited

U.S. PATENT DOCUMENTS

| | | | | |
|---|---|---|---|---|
| 3,349,805 A | * | 10/1967 | Fried ................ | 138/109 |
| 3,847,184 A | * | 11/1974 | God ................. | 138/120 |
| 3,929,165 A | * | 12/1975 | Diebolt et al. ....... | 138/121 |
| 4,593,690 A | * | 6/1986 | Sheridan et al. ..... | 128/207.15 |
| 4,966,202 A | * | 10/1990 | Bryan et al. ........ | 138/172 |
| 5,096,233 A | | 3/1992 | Dlouhy .............. | 285/129.1 |
| 5,311,753 A | | 5/1994 | Kanao ............... | 138/103 X |
| 5,312,138 A | * | 5/1994 | Patera et al. ........ | 285/12 |
| 5,335,945 A | * | 8/1994 | Meyers .............. | 285/236 |
| 5,704,401 A | * | 1/1998 | Fukui et al. ........ | 138/121 |

FOREIGN PATENT DOCUMENTS

| | | |
|---|---|---|
| DE | 197 25 051 A1 | 12/1998 |
| EP | 0 158 878 A1 | 10/1985 |
| EP | 0 527 297 A1 | 2/1993 |
| EP | 1 201 981 A1 | 5/2002 |
| JP | 10-115387 | 5/1998 |

OTHER PUBLICATIONS 03254152.6 (Abstract).

* cited by examiner

*Primary Examiner*—Patrick Brinson
(74) *Attorney, Agent, or Firm*—McKenna Long & Aldridge LLP

(57) ABSTRACT

A continuous drain hose for an electrical appliance having a water outlet is disclosed. The drain hose comprises a first cylindrical end portion being connectable to the water outlet, a second end portion being connectable to a drain pipe and comprising a bellows that is able to form a permanent bend when a temporary bending force is applied thereto, and a flexible corrugated portion connected between the first cylindrical end portion and the second end portion. The bellows is also permanently expandable or retractable when a temporary pulling or pressing force is applied thereto. The drain hose further comprises an elastic connection member, which is integrally molded to the first cylindrical end portion and is sealably connectable to the water outlet. The first cylindrical end portion comprises at least one annular ring externally formed thereon so as to prevent the molded elastic connection member from being disengaged from the first cylindrical end portion.

35 Claims, 12 Drawing Sheets

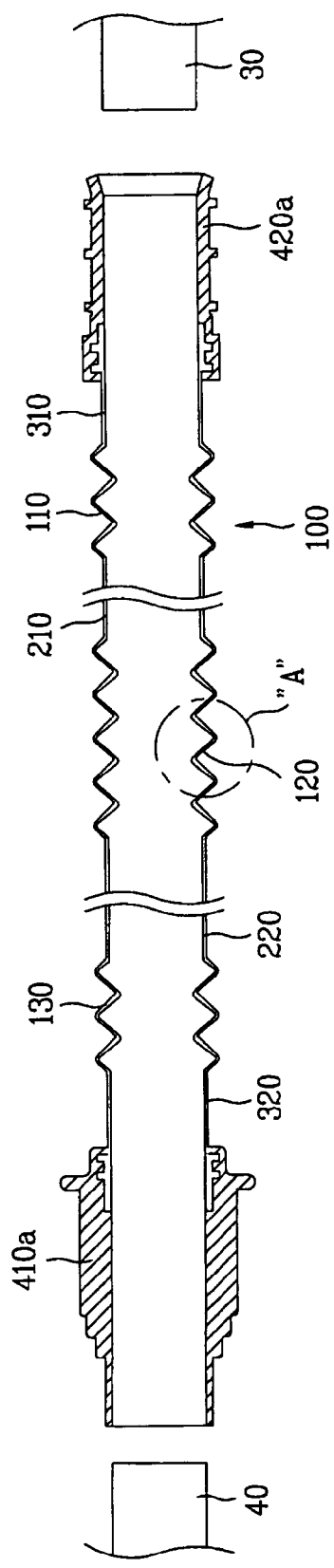

DRAIN HOSE FOR ELECTRICAL APPLIANCE HAVING WATER OUTLET

CROSS-REFERENCE TO RELATED APPLICATIONS

This application claims the benefit of Korean Application No. P2003-0018984, filed on Mar. 26, 2003, which is hereby incorporated by reference as if fully set forth herein.

BACKGROUND OF THE INVENTION

1. Field of the Invention

The present invention relates to a drain hose, and more particularly, to a continuous drain hose that connects a water outlet of an electrical appliance (e.g., a cloth washing machine or dish washer)

2. Discussion of the Related Art

The washing machine is an appliance which removes dirt in laundry with washing, rinsing, and spinning cycles using detergent and water. The washing machine is provided with a drain pump for pumping out washing or rinsing water from a tub to an exterior, and a drain hose connecting the drain pump and an external drain facility, such as drain pipe, for discharging the washing or rinsing water pumped by the drain pump to the exterior.

In general, since the drain facility, such as a drain pipe which is provided to a washing room of a building is arranged in a vertical direction, sometimes, a discharge side end portion of the drain hose is bent in a range of 90°~180° for easy connection to the drain facility. In general, the drain hose of the washing machine is a rubber tube, with a hard rubber or metal tube inserted to a discharge side end portion of the rubber tube, has the following drawbacks. First of all, a heavy rubber, or neoprene hose is expensive, liable to entangle, and excessively hard. Moreover, such a type of hose is extendable only by using special fittings and a clamp.

Currently, the drain hose of the washing machine is a corrugated plastic hose formed by casting or molding. This type of plastic hose is inexpensive, not liable to entangle, and more flexible than the heavy neoprene hose. However, the discharge side end portion of this type of plastic hose cannot be formed to have a permanently fixed shape due to a fabrication method of the plastic hose. Therefore, in general, for maintaining the 180° bend of the discharge side end portion of the plastic hose, a wire retainer is used. Nevertheless, the corrugated plastic hose has the following problems.

It is difficult for a side end portion of the light weight plastic hose to remain inserted in the drain pipe during vibration of the hose and strong pulsation of water when water is pumped out of the washing machine. The vibration of the hose in the drain pipe may also damage the hose due to friction. Moreover, the user may use the wire retained by during assembly of the corrugated hose. Lastly, this type of drain hose structure is unable to extend a length when required.

A drain hose assembly having a flexible and corrugated plastic hose, and a synthetic rubber nozzle connected to the plastic hose is also used. The plastic hose has a first end portion connected to the washing machine, and a second end portion having two annular barbs each projected along a circumferential surface. The nozzle has a third end portion with two recessed channels in an inside circumferential surface for receiving the two annular barbs for connection to the second end portion, and a fourth end portion of the discharge side end portion.

The drain hose assembly, in which the second end portion of the plastic hose is inserted in the third end portion of the nozzle, maintains sealing as outside circumferential surfaces of the two annular barbs are in close contact with an inside circumferential surface of the two annular channels. In this instance, the nozzle is rotatable with respect to the plastic hose when sealing is maintained. The nozzle is bent around 180° for easy connection to the drain pipe.

This type of drain hose does not entangle, is easy to mount, and permits stable connection with the drain pipe. However, the foregoing drain hose assembly has the following problems. The engagement of the rubber nozzle and the plastic hose may deform at an engaged part when the engaged part is exposed to high temperature washing water and detergent for a long time, which may cause leakage from the engaged part. When connection of the nozzle of the drain hose assembly of the nozzle and the hose to the drain pipe is difficult, the nozzle must be turned at an angle with respect to the hose until the connection becomes easy. In this instance, since the engaged part of the nozzle and hose is in close contact with each other for prevention of leakage of water, turning of the nozzle in an assembled state is difficult.

SUMMARY OF THE INVENTION

Accordingly, the present invention is directed to a drain hose for an electrical appliance having a water outlet that substantially obviates one or more of the problems due to limitations and disadvantages of the related art.

An object of the present invention is to provide a drain hose for an electrical appliance, such as washing machine or dish washer, having a water outlet, which can be bent easily for stable and convenient connection to a drain facility, and prevent leakage perfectly. Another object of the present invention is to provide a drain hose for an electrical appliance, such as a washing machine or dish washer, having a water outlet, of an improved structure which can prevent disengagement of the hose and the drain facility due to pulsation caused by irregular discharge of water.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a continuous drain hose for an electrical appliance having a water outlet (e.g., a clothes washing machine or dish washer) comprises a first cylindrical end portion connectable to the water outlet, a second end portion being connectable to a drain pipe and comprising a bellows that is able to form a permanent bend when a temporary bending force is applied thereto, and a flexible corrugated portion connected between the first cylindrical end portion and the second end portion. The bellows of the second end portion is also permanently expandable or retractable when a temporary pulling or pressing force is applied thereto.

The drain hose may further comprise an elastic connection member integrally molded to the first cylindrical end portion, and the elastic connection member is sealably connectable to the water outlet. The first cylindrical end portion may comprise at least one annular ring externally formed thereon so as to prevent the molded elastic connection member from being disengaged from the first cylindrical end portion. The bellows of the second end portion may comprise a plurality of folds for forming the permanent bend, where the profile of each fold comprises an inclined wall extending from a left lower point to a middle peak point and a declined wall extending from the middle peak point to a right lower point. In the profile, the angle formed between the inclined wall and a vertical axis passing through the middle peak point is greater than the angle formed between the vertical axis and the declined wall. The second end portion may further comprise a cylindrical portion directly connected to the bellows and an elastic connection member, which is integrally molded to the cylindrical portion and is sealably connectable to the drain pipe. The cylindrical portion of the second end portion may comprise at least one annular ring externally formed thereon so as to prevent the molded elastic connection member from being disengaged from the second end portion.

In another aspect of the present invention, a continuous drain hose for a clothes washing machine or dish washer having a water outlet comprises a first end portion being connectable to the water outlet and comprising a first bellows that is able to form a first permanent bend when a first temporary bending force is applied thereto, a second end portion being connectable to a drain pipe and comprising a second bellows being able to form a second permanent bend when a second temporary bending force is applied thereto, and a flexible corrugated portion connected between the first and second end portions.

The first end portion may further comprise a cylindrical portion directly connected to the first bellows and an elastic connection member, which is integrally molded to the cylindrical portion and is sealably connectable to the water outlet. The cylindrical portion of the first end portion may comprise at least one annular ring externally formed thereon so as to prevent the molded elastic connection member from being disengaged from the first end portion. In addition, the second end portion of the drain hose may further comprise a cylindrical portion directly connected to the second bellows, and an elastic connection member, which is integrally molded to the cylindrical portion and is sealably connectable to the drain pipe. The cylindrical portion of the second end portion may comprise at least one annular ring externally formed thereon so as to prevent the molded elastic connection member from being disengaged from the second end portion.

In another aspect of the present invention, a continuous drain hose for a clothes washing machine or a dish washer having a water outlet comprises a first end portion being connectable to the water outlet and comprising a first bellows being able to form a first permanent bend when a first temporary bending force is applied thereto, a second end portion being connectable to a drain pipe and comprising a second bellows being able to form a second permanent bend when a second temporary bending force is applied thereto, and a third bellows being able to be permanently expanded or retracted when a first temporary pulling or pressing force is applied thereto. The drain hose further comprises a first flexible corrugated portion connected between the first end portion and the third bellows and a second flexible corrugated portion connected between the third bellows and the second end portion.

Each of the first and second bellows is also permanently expandable or retractable when a second temporary pulling or pressing force is applied thereto, and on the other hand, the third bellows is able to form a third permanent bend when a third temporary bending force is applied thereto.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIG. 4 illustrates a section of the drain hose in FIG. 3;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The drain hose of the present invention includes a first end portion, a second end portion, and a corrugated portion for connecting the first and second end portions. The first and second end portions may have a variety of forms, and free flexible bending means may be further provided in the middle of the corrugated portion. Accordingly, there may be a variety of embodiments of the drain hose as the above elements make many combinations. Detailed embodiments of the elements will be described, with reference to the attached drawings.

Figure 1A:
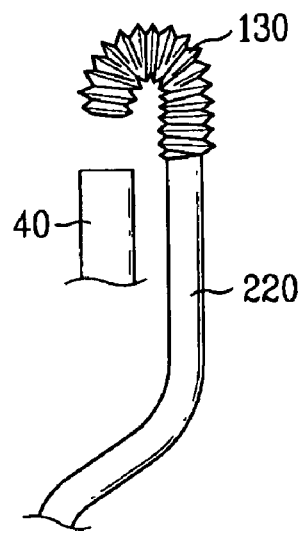
FIGS. 1A~ID illustrate different embodiments of a second end portion of a drain hose of the present invention each showing a 180° bent second bellows, schematically.

FIGS. 1A~1D illustrate different embodiments of one end portion of a drain hose of the present invention, particularly, different embodiments of a second end portion connected to an external drain pipe 40 of the present invention. FIG. 1A illustrates an embodiment in which the second end portion of the drain hose only has a bellows, which is called a second bellows 130 for convenience of description.

Before starting description of the second bellows 130, the corrugated portion connecting the first and second end portions will be described, briefly. For convenience of description, the corrugated portion will be called a second corrugated portion. The second corrugated portion 220 is a corrugated tube of a flexible plastic having a plurality of corrugations on an outside circumference for improving the strength of the tube. The corrugated tube is employed in many general washing machines as drain hoses of washing machines, of which detailed description will be omitted. In the present invention, the corrugation is omitted for simplicity and for a more clear distinction from the second bellows 130.

The bellows 130 is formed in succession to the second corrugated portion 220. The second bellows 130 is able to form a permanent bend when a temporary bending force is applied. The permanent bend implies not a perfect and irreversible bending, but a bending where the bending can be maintained after the temporary bending force is removed. Therefore, the second bellows 130 can be bent freely by applying an external force thereto whenever required. Moreover, a length of the bellows 130 is also extendable. It is preferable that both the second corrugated portion 220 and the second bellows 130 are formed of plastic as one unit by molding or casting.

Referring to FIG. 1A, in the embodiment where the second end portion of the drain hose includes a second bellows 130 connected to the second corrugated portion 220 in succession, an end portion of the second bellows 130 is inserted in a drain pipe 40 to a depth and the second bellows 130 is bent to an optimal angle and form for using the drain hose. FIG. 1A illustrates a shape the second bellows 130 is bent by 180°.

In the meantime, if a diameter of the drain pipe 40 is smaller than the second bellows 130, after inserting a portion of the second bellows 130, the second bellows 130 may be clamped with a clamp or band for prevention of leakage.

When one end portion of the drain hose connected to the drain pipe 40 has the foregoing structure, since the bellows 130 can be bent easily even if position and angle of the drain pipe 40 may vary, mounting of the drain hose is very easy.

Figure 1B:
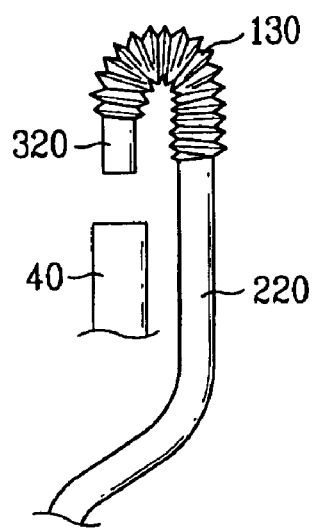
FIGS. 1E and 1F illustrate the embodiments in FIG. 1C each showing a 90° bent second bellows, schematically.

In the embodiment illustrated in FIG. 1B, the second end portion of the drain hose of the present invention includes a second bellows 130 and a second cylinder portion 320. Since the second corrugated portion 220 has the same structure and connection as the embodiment described with reference to FIG. 1A, description of the second corrugated portion 220 will be omitted. Only the second cylinder portion 320 will be described.

The second cylinder portion 320 has opened opposite ends and is formed in continuation to the second bellows 130. The second cylinder portion 320 has no corrugation on an outside thereof. The second cylinder portion 320 is formed of plastic. It is preferable that the second cylinder portion 320 is formed as one unit with the second bellows 130 and the second corrugated portion 220 by casting or molding.

In the embodiment of the drain hose of the present invention illustrated in FIG. 1B, a portion of or entire second cylinder portion 320 is inserted in the drain pipe 40. In this instance, after inserting the second cylinder portion 320 in the drain pipe 40, the second bellows 130 is bent to an optimal angle and form taking environmental structure into account. FIG. 2B also illustrates the second bellows 130 bent by 180°.

In this embodiment too, if a diameter of the drain pipe 40 is smaller than a diameter of the second cylinder portion 320, the second cylinder portion 320 and the drain pipe 40 may be connected by inserting a portion of the drain pipe 40 in the second cylinder portion 320 and clamping with a clamp or a band.

The drain hose of a structure shown in FIG. 1B enables easy connection to the drain pipe 40, and prevents separation of the drain hose from the drain pipe 40 caused by vibration and pulsation which occurs from discharge of water because the second cylinder portion 320 having a weight is inserted in the drain pipe 40.

The second end portion of the drain hose illustrated in FIG. 1B includes a second bellows 130, a second cylinder portion 320, and an elastic second connection member 420a. Detailed structures of, and connection between the second bellows 130 and the second cylinder portion 320 are the same as that described with reference to FIGS. 1A and 1B, of which description will be omitted, and the second connection member 420a will be described.

Figure 5A:
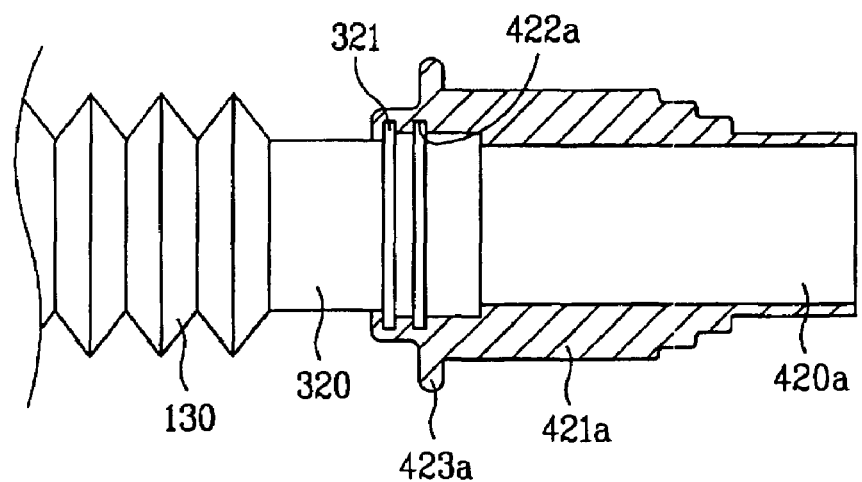
FIG. 5A illustrates a section showing connection of a second cylindrical part and a second connection member in a drain hose having the embodiment in FIG. 1C applied thereto.

The second connection member 420a, provided for easy connection of the drain hose to the drain pipe 40, is a tube of an elastic rubber. The second connection member 420a has one end portion integrally molded with the second cylinder portion 320 and the other end portion sealably connected to the drain pipe 40. Detailed structures and connection of the second connection member 420a and the second cylinder part 320 are shown in FIG. 5A, referring to which the detailed structures and connection of the second connection member 420a and the second cylinder part 320 will be described in detail.

The second connection member 420a is formed of an elastic rubber molded at an end portion of the second cylinder portion 320 as one unit therewith. The second connection member 420a is cylindrical, and includes a plurality of reinforcing ribs 421a on an outside circumference for reinforcing strength. As shown in FIG. 5A, the reinforcing ribs 421a project from the outside circumferential surface of the second connection member 420a in a radial direction, are disposed at regular intervals along a circumferential direction thereof, and extend in a length direction thereof. For example, the reinforcing ribs 421a project from upper and lower, left and right sides of the outside circumferential surface of the second connection member 420a, to form a cross when the first connection member 420a is seen from a front, as shown in FIG. 5C. The reinforcing ribs 421a reinforce strength and an elastic restoring force of the second connection member 420a.

The second connection member 420a and the second cylinder portion 320 are provided with structures for preventing separation from each other. That is, the second cylinder portion 320 has at least one annular ring 321 on an outside surface thereof, and the second connection member 420a has at least one annular groove 422a in an inside surface thereof for inserting the ring 321 therein. Therefore, even if a force is applied to the connection of the second connection member 420a and the second cylinder portion 320 in a length direction, the second connection member 420*a* and the second cylinder portion 320 are not separated from each other.

The second connection member 420*a* also has a flange 423*a* for reinforcing a connection part to the second cylinder part 320. As shown in FIG. 5A, the flange 423*a* is provided in the vicinity of a part which becomes thins out due to the annular groove 422*a*. The flange 423*a* serves, not only for strength reinforcement, but also for an easy gripping of the drain hose to prevent the drain hose from slipping off the hand when the drain hose is connected to, or separated from, the drain pipe 40.

In the meantime, for keeping positive and reliable connection and sealing between the drain pipe 40 and the second connection member 420*a* for a long time, a clamp or a band may be used for the connection between the second connection member 420*a* and the drain pipe 40.

Figure 1C:
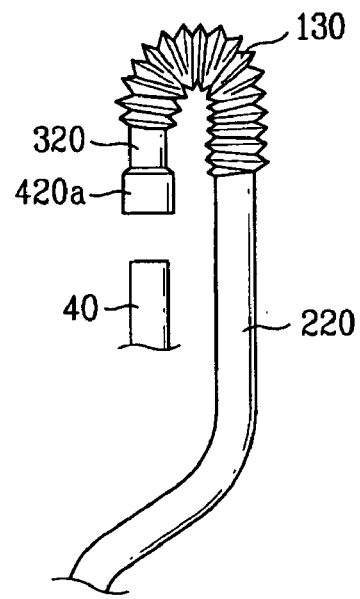

For using the drain hose of the present invention having the second end portion that has the structure as shown in FIG. 1C, a portion of the drain pipe 40 is inserted in the second connection member 420*a*, and bent appropriately to suit an environment. FIG. 1C illustrates an example of the second bellows 130 being mounted where the second bellows 130 is bent by 180°.

In this case, the second connection member 420*a* expands in a radial direction elastically when the drain pipe 40 is inserted into the second connection member 420*a*, such that the second connection member 420*a* squeezes the drain pipe 40 in the radial direction when insertion of the drain pipe 40 is finished, to make an inside circumferential surface of the second connection member 420*a* a perfect close contact with the outside circumferential surface of the drain pipe 40.

In the meantime, though not shown, in a case the diameter of the drain pipe 40 is greater than the diameter of the second connection member 420*a*, the drain hose may be mounted in a form similar to that illustrated in FIG. 1B. That is, the drain hose is mounted by inserting the second connection member 420*a* of rubber in the drain pipe 40 to a depth, and bending the second bellows 130 appropriately. When the drain hose is mounted thus, because the second connection member 420*a* of rubber is heavier than plastic, the portion of the second connection member 420*a* inserted in the drain pipe 40 is not separated from the drain pipe 40 even if vibration and pulsation occurs when water is discharged from the washing machine.

Therefore, if the second end portion of the drain hose has a structure illustrated in FIG. 1C, more positive connection and sealing can be maintained for a long time, together with the advantages of the embodiment described with reference to FIG. 1A.

Figure 1D:
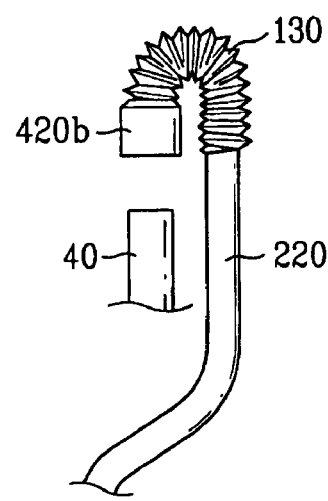

In the meantime, FIG. 1D illustrates an embodiment in which a second end portion of the drain hose of the present invention includes a second bellows 130 and a second connection member 420*b*. Different from the embodiment illustrated in FIG. 1C, the embodiment illustrated in FIG. 1D has a unique structure in which no second cylinder portion 320 is provided therewith, and the second connection member 420*b* is directly connected to the second bellows. In this embodiment, a structure of the second bellows 130 is the same with the structure described with reference to FIG. 1A, description of which will be omitted. Connection between the second bellows 130 and the second connection member 420*b* will be described.

Figure 5B:
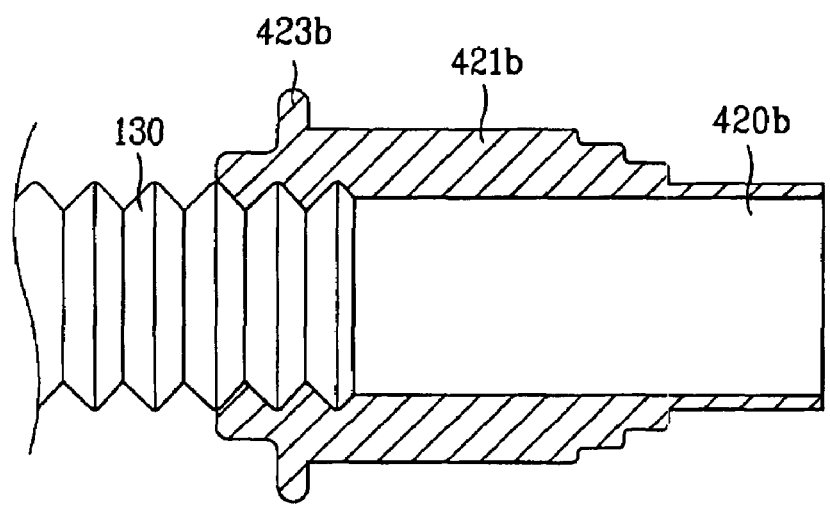
FIG. 5B illustrates a section showing connection of a second cylindrical part and a second connection member in a drain hose having the embodiment in FIG. 1D applied thereto.
Figure 5C:
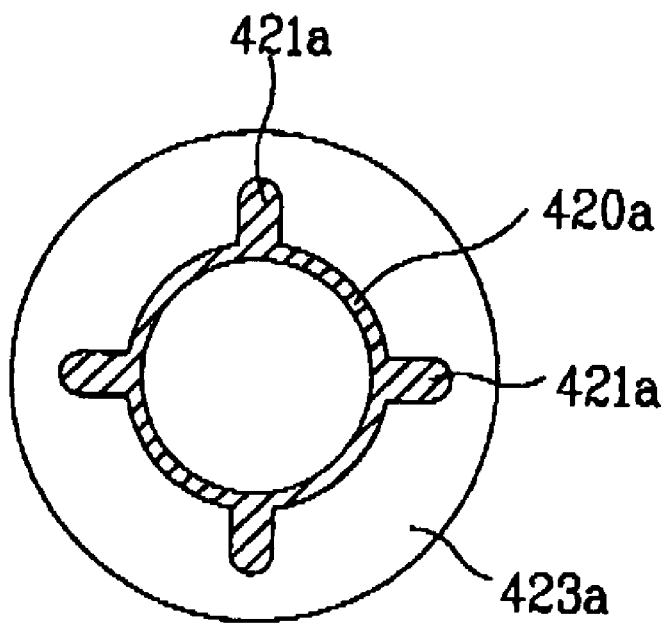
FIG. 5C illustrates a cross-sectional view of a hose in accordance with an embodiment of the present invention.

FIG. 5B illustrates a connection between a second connection member 420*b* and a second bellows 130. Referring to FIG. 5B, the second connection member 420*b* is provided with ribs 421*b* and a flange 423*b* identical to the embodiment described with reference to FIG. 5A, of which structures are the same with the embodiment described with reference to FIG. 5A, and description of which will be omitted. However, as shown in FIG. 5B, in the present invention, one end of the second connection member 420*b* is directly connected to the second bellows 130. It is preferable that the second connection member 420*b* is molded as one unit with the second bellows 130. As shown in FIG. 5B, once the second connection member 420*b* and the second bellows 130 are molded as one unit, an outside surface of the corrugated second bellows 130 serves the same with the annular ring 321 in FIG. 5A, to prevent the second bellows 130 and the second connection member 420*b* from being separated by a force applied in the length direction.

If the second end portion of the drain hose of the present invention has a structure illustrated in FIG. 1D, the drain hose is mounted by inserting the second connection member 420*b* in the drain pipe 40 or inserting a portion of the drain pipe 40 in the second connection member 420*b*, and bending the second bellows 130, appropriately. As such a mounting structure and advantages are similar to the mounting structure and advantages described with reference to FIG. 1C, detailed description will be omitted.

Figure 1E:
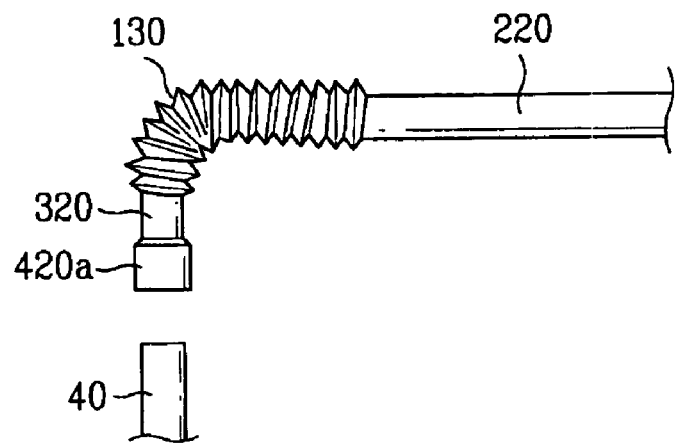
Figure 1F:
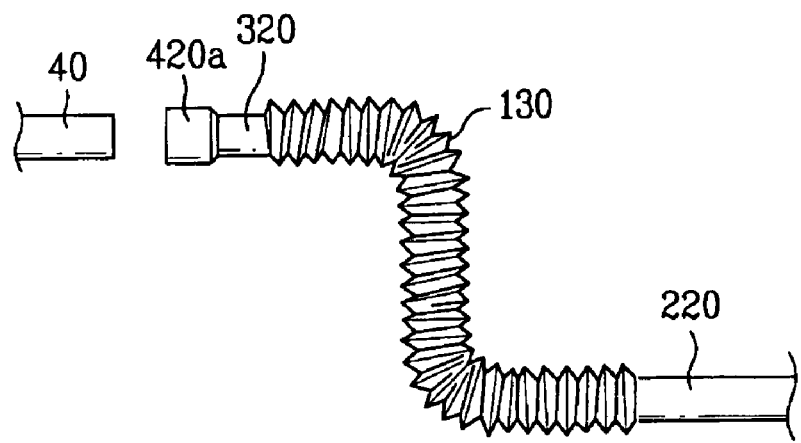

In the meantime, FIGS. 1A~1D illustrate examples each showing the drain hose with the second bellows bent in a range of 180°. However, the drain hose of the present invention can be mounted, with the second bellows 130 bent to different angles suitable to different environments, such as a position of the drain pipe 40. Such examples of mounting the drain hose, with the second bellows 130 bent to different angles, for example, 90°, are illustrated in FIGS. 1E and 1F.

Figure 2A:
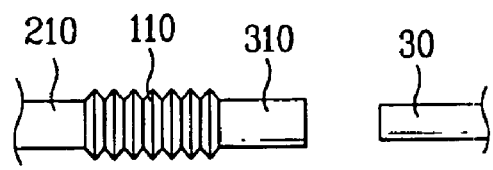
FIGS. 2A~2C illustrate different embodiments of a first end portion of a drain hose of the present invention.
Figure 2B:
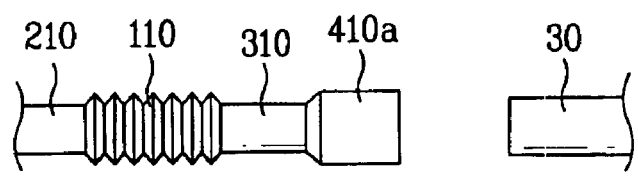
Figure 2C:
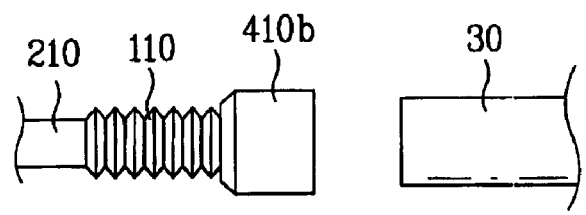

In the meantime, FIGS. 2A~2C illustrate different embodiments of a first end portion of the drain hose, which will be described in detail with reference to the attached drawings.

FIG. 2A illustrates an embodiment in which a first end portion to be connected to a water outlet 30 of the washing machine includes a first bellows 110 and a first cylinder portion 310. Structures of the first bellows 110 and the first cylinder portion 310 are the same as the structures of the second bellows 130 and the second cylinder portion 320 described with reference to FIG. 2A. The unexplained reference numeral 210 in FIG. 2A denotes a portion of the corrugated tube.

If the first end portion of the drain hose has a structure as shown in FIG. 2A, the drain hose can be used more favorably in a situation where the washing machine is installed within a narrow space, which will be described in more detail.

The washing machine is in general installed in a washing room, or the like, of a building, where a back or side of the washing machine is close to a wall of the washing room for better utilization of space. Once the washing machine is installed close to the wall of the washing room, the drain hose connected to the back or side of the washing machine is folded or pressed, to block a water passage. For solving this problem, it is required to provide a gap between the washing machine and the wall of the washing room to secure a bending radius at which the drain hose does not fold, in which the space utilization is poor.

The foregoing problem can be solved completely if the drain hose of the present invention including the first end portion with the first bellows 110 illustrated in FIG. 2A is used. That is, since the first bellows 110 is bent freely, and has a bending diameter substantially smaller than a general corrugated drain hose, even if the washing machine is installed close to the wall of a washing room, the drain hose is not pressed or folded, thereby enhancing space utilization.

In the meantime, by fastening a connection part of the water outlet 30 and the first cylinder part 310 with a clamp or a band, sealing of the connection part can be improved.

FIG. 2B illustrates an embodiment in which a first end portion of the drain hose includes a first bellows 110, a first cylinder portion 310, and a first connection member 410a. Structures of the first bellows 110 and the first cylinder portion 310 are the same as the foregoing embodiments, thus description will be omitted. A structure of the first connection member 410a, and connection between the first cylinder portion 310 and the first connection member 410a will be described.

Figure 6A:
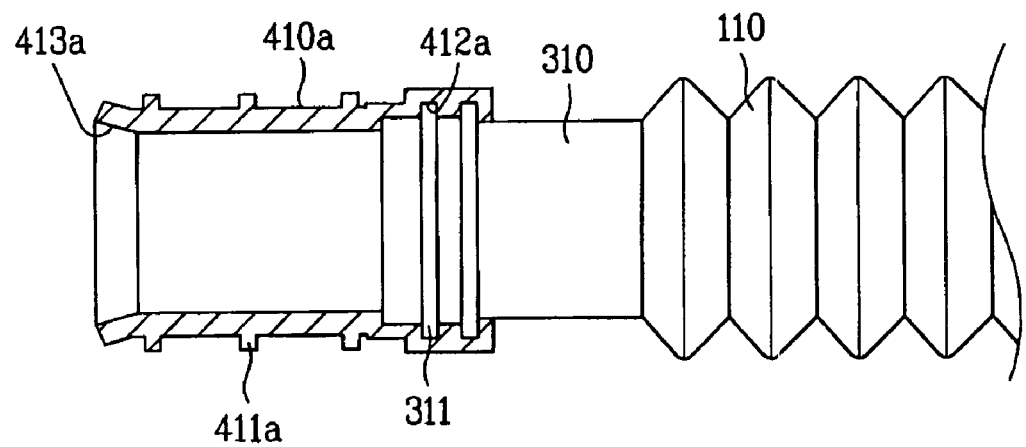
FIG. 6A illustrates a section showing connection of a first cylindrical part and a first connection member in a drain hose having the embodiment in FIG. 2B applied thereto.

Referring to FIG. 6A, structures for firm connection of the first connection member 410a and the first cylinder part 310 are provided to the first connection member 410a and the first cylinder part 310. That is, even if the first connection member 410a and the first cylinder part 310 are molded as one unit, since the first connection member 410a and the first cylinder part 310 are formed of different material of rubber and plastic, the following structures are provided for increasing a reliability of the connection.

The first cylinder portion 310 of plastic has at least one annular ring projecting from an outside circumferential surface. The first connection member 410a of elastic rubber has a groove 412a in an inside circumferential surface for inserting and seating the annular ring 311 of the first cylinder portion 310. Therefore, once the first connection member 410a and the first cylinder part 310 are molded together with the foregoing structures, the connection between the first connection member 410a and the first cylinder part 310 is not easily loosened, even if a force caused by various reasons, such as vibration and pulsation of water, is applied to the first connection member 410a and the first cylinder part 310 in a length direction, and seals the connection.

The first connection member 410a of elastic rubber has at least one rib 411a on an outside surface for reinforcing strength and elastic force. The rib 411a in FIG. 6A shows an example of the rib 411a projecting from the outside surface in a circumferential direction of the first connection member 410a. This type of projection of the rib 411a, increasing a radial direction thickness of the first connection member 410a locally, has effects that the strength of the first connection member 410a is increased, and the elastic force of the first connection member 410a which comes into close contact with the outside surface of the water outlet 30 is reinforced when the first connection member 410a is inserted in, and fixed to the water outlet 30 of the washing machine. The rib 410 also serves to prevent slipping when gripped by a hand.

Referring to FIG. 6A, the first connection member 410a has a flare portion 413a having a diameter which increases gradually like a horn at the other end for connection to the water outlet 30, for easy insertion of the water outlet 30 into the first connection member 410a.

In the meantime, though not shown, a clamp or a band may be additionally used for firmer connection of the first connection member 410a and the water outlet 30 and improving sealing of the connection part. If the clamp or band is used, the plurality of annular ribs 421a on the outside surface of the second connection member 420a can fix a fastening position of the clamp or the band, and prevent slipping of the clamp or the band in the length direction.

The embodiment of the first end portion of the drain hose illustrated in FIG. 2B having the foregoing structure can provide more reliable connection owing to the first connection member 410a of rubber, while the embodiment still has all the advantages of the foregoing embodiments. That is, the insertion of the outside circumferential surface of the water outlet 30 to an inside circumferential surface of the first connection member 410a for connecting the first end portion of the drain hose and the water outlet 30, the first connection member 410a expands elastically, such that the inside circumferential surface of the first connection member 410a and the outside circumferential surface of the water outlet 30 come into close contact with by the elastic force upon insertion, to secure a higher air tightness at the connection part.

Figure 6B:
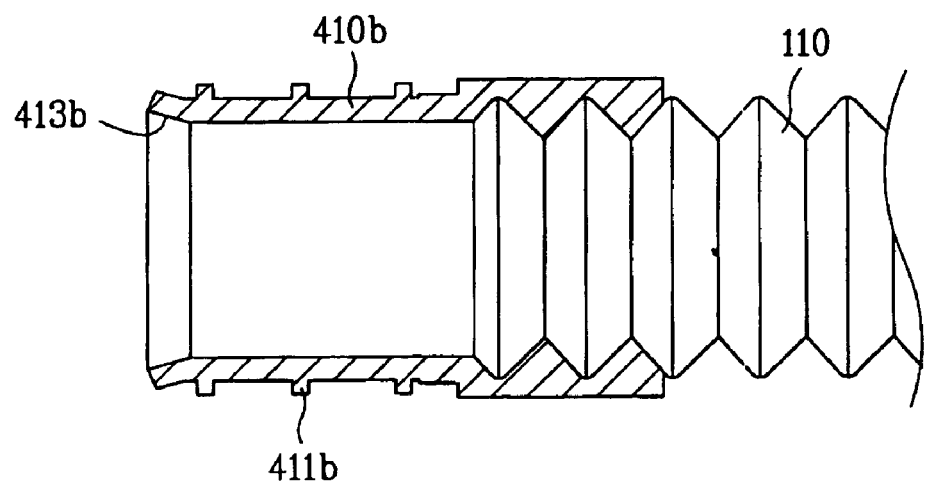
FIG. 6B illustrates a connection of a first connection member to water outlet according to FIG. 2C.

FIG. 2C illustrates an embodiment in which a first end portion of the drain hose includes a first bellows 110, and a first connection member 410b. Description of structures of the first bellows 110 and the first connection member 410a wass given previously, and therefore, will be omitted. As shown in FIG. 6B, in this embodiment, the first connection member 410b is molded as one unit with the first bellows 110. Neither the groove 412a, nor the annular ring 311 suggested in the embodiment described with reference to FIGS. 2B and 6a is provided. In this embodiment, since the first connection member 410b is connected to the water outlet 30 in a manner similar to the embodiment described with reference to FIG. 2B, a reliability of a sealed connection can be improved.

As described with reference to FIGS. 1A~2C, the second end portion and the first end portion of the drain hose of the present invention can be used for a variety of embodiments. The second end portion and the first end portion, connected with a flexible corrugated portion, form the drain hose of the present invention. Therefore, though not shown for every drain hose individually, the drain hose of the present invention can be used for a variety of embodiments having the second end portion and the first end portion joined to opposite ends of the corrugated portion.

The present invention is not limited to this, but another bellows extendable freely in a length direction may be provided in the middle of the corrugated portion, which will be called a third bellows for distinguishing this from the first and second bellows. In a case where the third bellows is provided in the middle of the corrugated portion, the corrugated portion has a first corrugated portion and a second corrugated portion connected to opposite ends of the third bellows. Therefore, the drain hose of the present invention having the third bellows provided thereto includes a first end portion, a first corrugated portion, a third bellows, a second corrugated portion, a second bellows, and a second end portion, which are connected in succession.

Figure 3:
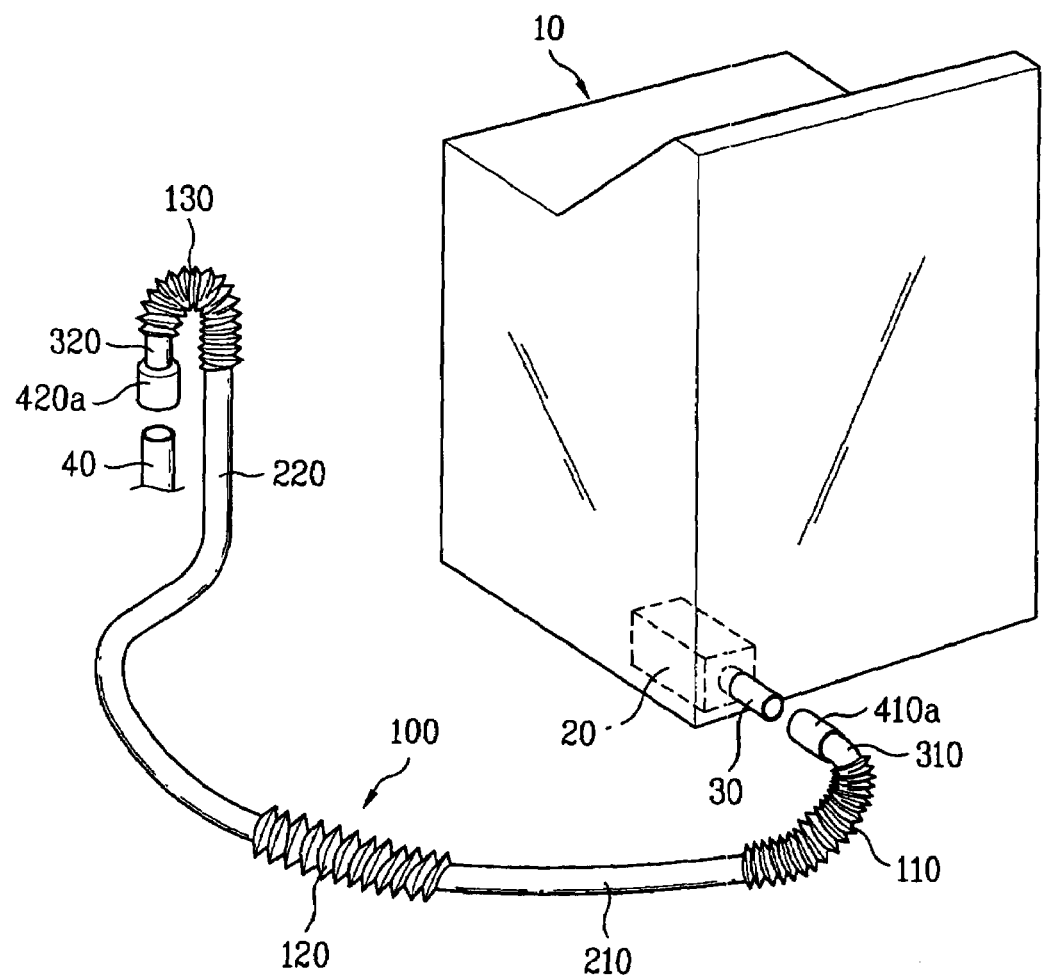
FIG. 3 illustrates a perspective view of one embodiment of a drain hose having embodiments of the FIGS. 1C and 2B applied thereto in use.

For clearer description of an overall structure of the drain hose of the present invention, one embodiment will be described. FIG. 3 or 4 illustrates one embodiment of the drain hose 100 including a first end portion of the embodiment in FIG. 2B, a second end portion of the embodiment in FIG. 1C, and the first corrugated portion 210, the third bellows 120, and the third bellows 120 connected in succession, which connect the first end portion and the second end portion. The drain hose has a first cylinder portion 310, the first corrugated portion 210, the third bellows 120, the second corrugated portion 220, and a second cylinder portion formed of plastic as one unit, and the first connection member 410a and the second connection member 420a molded as one unit so as to be connected to the first cylinder portion 310 and the second cylinder portion 320. The drain hose 100 thus fabricated has the following advantages.

The first end portion, to be connected to a short water outlet 30 connected to the drain pump 20 of the washing machine 100, can be connected with ease, even in a narrow space, without folding or pressing of the drain hose 100, because the first bellows 110 can be bent freely. Of course, the first connection member 410a of rubber, to be connected to the water outlet 30 directly, enables an easy connection, and enhances sealing of the connection part to prevent leakage of water.

Since the second bellows 130 can be bent freely, the second end portion, to be connected to an external drain pipe 40, is very convenient since no inconvenient work, such as turning of the drain hose or the like is not required. Of course, the second bellows 130 can be mounted with ease even in a narrow space because the second bellows 130 has a bending radius substantially smaller than a general drain hose. Moreover, the second connection member 420a of rubber which is to be connected to the drain pipe 40 directly, not only enables an easy connection, but also enhances sealing of the connection part, to prevent water leakage.

The third bellows 120 is extendable freely in a length direction. Therefore, in a case where the drain pipe 40 and the washing machine 100 are installed far away from each other, the third bellows 120 can be extended for securing a required length. Also, when the drain pipe 40 and the washing machine 100 are installed very close, the third bellows 120 may be contracted in the length direction, so as not to use an unnecessary space. Because the third bellows 120 is extendable/contractible in the length direction as well as bendable freely, the drain hose 100 can be mounted very easily even in a case where the drain hose 100 can only be bent in the middle due to environmental structure. Of course, the third bellows 120 is extendable/contractible in the length direction, and alike the first or second bellows 110 or 130, is bendable freely.

Figure 7:
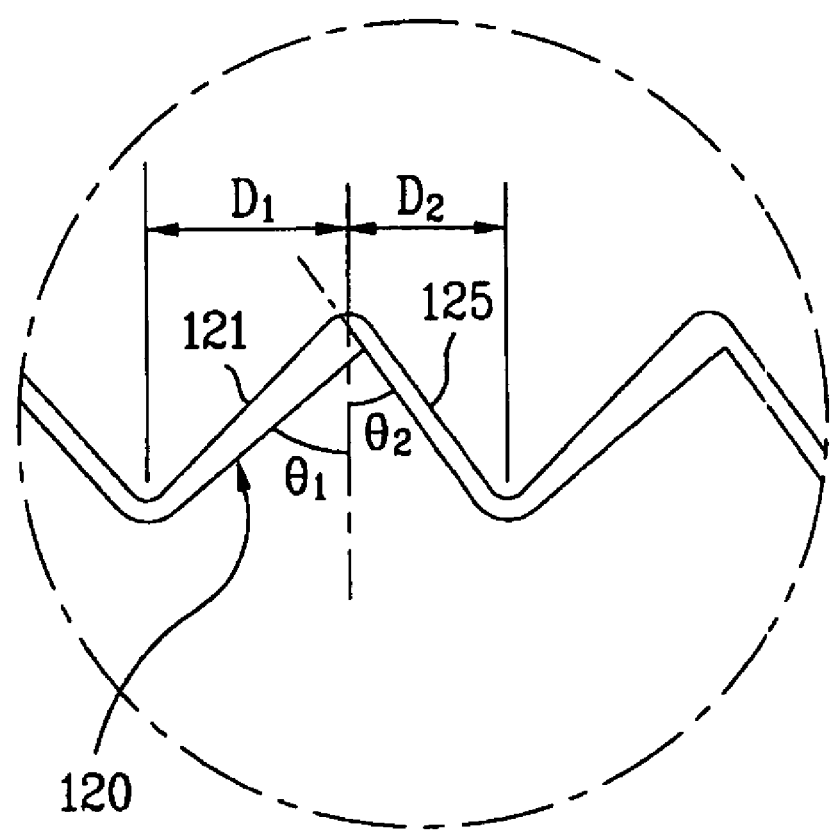
FIG. 7 illustrates an enlarged section of an "A" part in FIG. 4.

In the meantime, FIG. 7 illustrates an enlarged section of a portion of the third bellows. This sectional structure is applicable, not only to the third bellows 120, but also to the first and second bellows 110 and 130.

Referring to FIG. 7, the third bellows 120 includes a plurality of folds each having a middle peak and a lower point for forming the permanent bend. The fold has an inclined wall 121 extending from a left lower point toward a middle peak point, and a declined wall 125 extending from the middle peak point toward a right lower point.

The fold has the following features. First, a first angle $\theta_1$ between a vertical axis passing through the middle peak point and the inclined wall 121 is greater than a second angle $\theta_2$ between the vertical axis and the declined wall 125. A horizontal length $D_1$ of the inclined wall 121 is different from a horizontal length $D_2$ of the declined wall 125.

Referring to FIG. 7, an embodiment of the fold in which the horizontal length $D_2$ of the inclined wall 121 is shorter than the horizontal length $D_1$ of the declined wall 125 will be described.

The section of the third bellows 120 illustrated in FIG. 7 is symmetrical with respect to an axis of the third bellows 120 illustrated in FIG. 4. Such a structure of the third bellows 120 undergoes a length reduction as bellows are contracted when the declined wall 125 comes into close contact with the inclined wall 121. Opposite to this, when the declined wall 125 comes apart from the inclined wall 121, the third bellows 120 undergoes extension of the length to a form as shown in FIG. 7. The third bellows 120 is extendable in the length direction freely under the foregoing principle.

In the meantime, if the third bellows 120 is in a state in which the inclined and declined walls 121 and 125 come into close contact with each other in one side portion of the axis and the inclined and declined walls 121 and 125 come apart from each other in the other side portion of the axis, the third bellows 120 bends toward the side the inclined and the declined walls 121 and 125 come into close contact with each other.

The principles of extension and bending of the third bellows 120 are also applicable to the first and second bellows 110 and 130.

Figure 8:
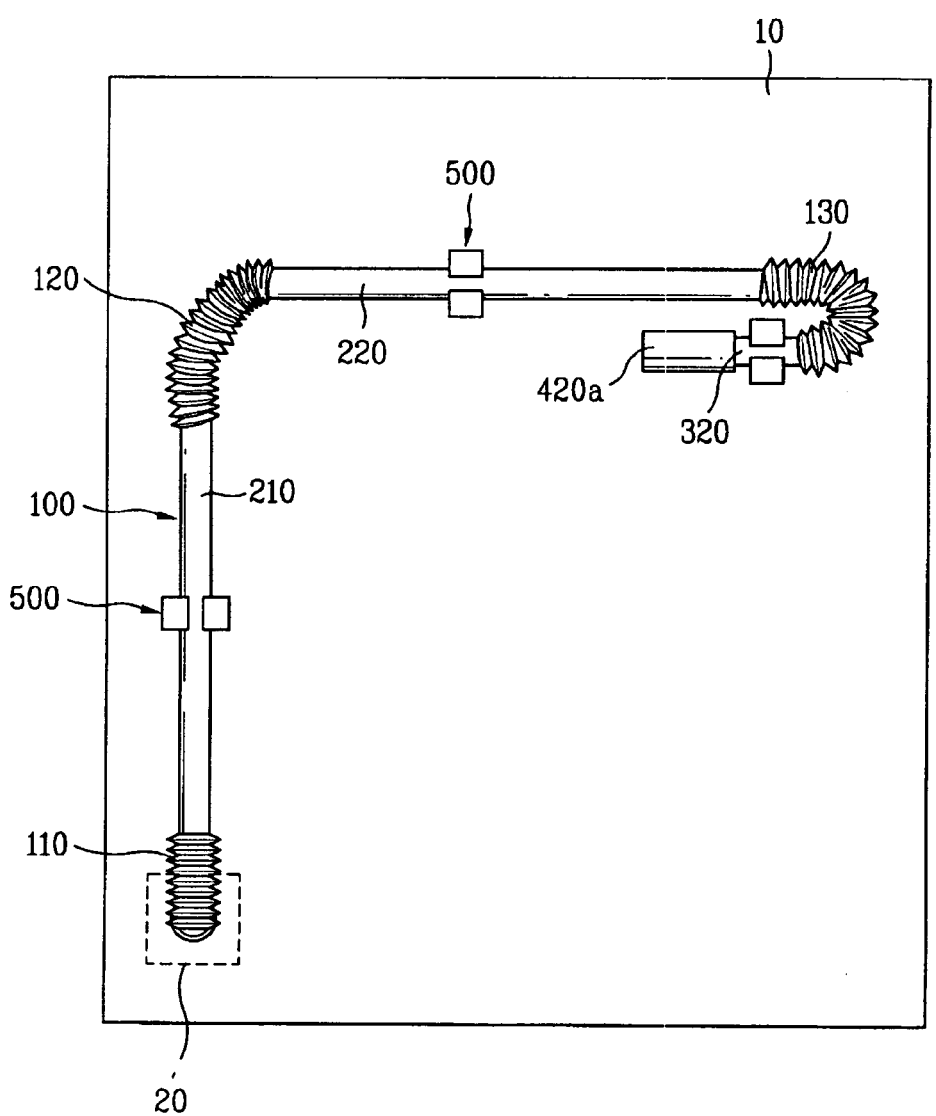
FIG. 8 illustrates a back side perspective view of a washing machine having a drain hose holder provided thereto, additionally.

In the meantime, referring to FIG. 8, the present invention provides a structure for attaching the drain hose 100 close to a side of the washing machine 100 during transportation and movement of the washing machine 100. To do this, the washing machine 100 is provided with a plurality of hose holders 500 on one side surface, for an example, on a back surface.

Figure 9:
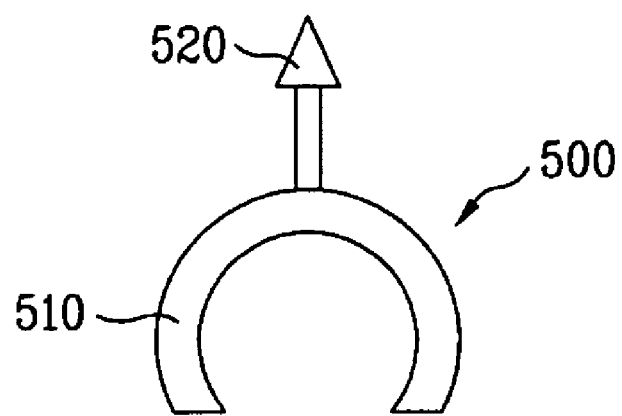
FIG. 9 illustrates a plan view of an embodiment of a drain hose holder.

Referring to FIG. 9, the hose holder 500 includes a holding part 510 having an inner circumferential surface in the form of an arc, and a fixing pin 520 to be inserted in, and fixed to one surface of the washing machine 100.

The holding part 510 is of an elastic material and enables the forced push-in of the drain hose 100 through an opened one side of the holding part 510, to seat the drain hose 100 on the inner circumferential surface of the arc. In this instance, opposite ends of the holding part 510 move apart to opposite directions elastically, and, since the opposite ends of the holding part 510 return to original positions elastically after the drain hose 100 is inserted into the inner circumferential surface of the arc, the drain hose 100 cannot escape from the holding part 510, since the draing hose 100 is caught by the opposite ends of the holding part 510. As shown in FIG. 9, the fixing pin 520 has a wedge shaped head for forced insertion into a hole in one surface of the washing machine.

A plurality of the hose holders 500 are provided to the one surface of the washing machine 10 for holding different parts of the drain hose 100. Once the hose holders 500 are thus provided to the one surface of the washing machine 10, transportability of the washing machine 10 is improved and damage to the drain hose 100 can be reduced as the drain hose 100 can be attached close to the washing machine in an orderly fashion.

As has been described, the drain hose of the present invention has the following advantages. First, the freely bendable bellows provided to opposite ends of the drain hose permits very easy mounting of the drain hose under any circumstances. Second, the freely extendable bellows provided in the middle of the drain hose provides an optimal length required for mounting the drain hose. Third, the connection members of rubber at opposite ends of the drain hose prevent leakage of water and secure reliability of connection. Fourth, the molding of all elements including the connection members, the bellows, and the corrugated portion as one unit prevents leakage of water effectively, as there is no mechanical connection part. The advantages of the present invention include all the effect and advantages described in the detailed description of the preferred embodiment in addition to above.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A continuous drain hose for an electrical appliance having a water outlet, the drain hose comprising:

a first cylindrical end portion being connectable to the water outlet;

a second end portion being connectable to a drain pipe, the second end portion comprising a bellows that is able to form a permanent bend when a temporary bending force is applied thereto;

a flexible corrugated portion connected between the first cylindrical end portion and the second end portion and an elastic connection member integrally molded to the second end portion, wherein the second end portion includes at least one annular ring which engages the elastic connection member, wherein said elastic connection member includes a plurality of ribs where a cross section of the plurality of ribs forms a cross.

2. The drain hose of claim 1, wherein the permanent bend is a 180 or 90 degree arc.

3. The drain hose of claim 1, wherein the elastic connection member being sealably connectable to the water outlet.

4. The drain hose of claim 3, wherein the at least one annular ring prevents the molded elastic connection member from being disengaged from the first cylindrical end portion.

5. The drain hose of claim 1, wherein the bellows of the second end portion comprises a plurality of folds for forming the permanent bend and a profile of each of the plurality of folds comprises:

an inclined wall extending from a left lower point to a middle peak point; and a declined wall extending from the middle peak point to a right lower point, wherein a first angle formed between the inclined wall and a vertical axis passing through the middle top point is greater than a second angle formed between the vertical axis and the declined wall.

6. The drain hose of claim 1, wherein the bellows of the second end portion comprises a discharge end which is insertable into the drain pipe.

7. The drain hose of claim 1, wherein the second end portion further comprises a cylindrical portion directly connected to the bellows, the cylindrical portion comprising a discharge end which is insertable into the drain pipe.

8. The drain hose of claim 1, wherein the second end portion further comprises:

a cylindrical portion directly connected to the bellows; and an elastic connection member integrally molded to the cylindrical portion, the elastic connection member being sealably connectable to the drain pipe.

9. The drain hose of claim 8, wherein the cylindrical portion of the second end portion comprises at least one annular ring prevents the molded elastic connection member from being disengaged from the second end portion.

10. The drain hose of claim 1, wherein the second end portion further comprises an elastic connection member integrally molded to a portion of the bellows, the elastic connection member being sealably connectable to the drain pipe.

11. The drain hose of claim 1, wherein the bellows of the second end portion is permanently expandable or retractable when a temporary pulling or pressing force is applied thereto.

12. A continuous drain hose for a clothes washing machine or a dish washer having a water outlet, the drain hose comprising:

a first end portion being connectable to the water outlet, the first end portion comprising a first bellows that is able to form a first permanent bend when a first temporary bending force is applied to thereto;

a second end portion being connectable to a drain pipe, the second end portion comprising a second bellows that is able to form a second permanent bend when a second temporary bending force is applied thereto;

a flexible corrugated portion connected between the first and second end portions and an elastic connection member, wherein said second bellows is disposed within said elastic connection member, wherein said elastic connection member includes a plurality of ribs where a cross section of the plurality of ribs forms a cross.

13. The drain hose of claim 12, wherein the first end portion further comprises an elastic connection member integrally molded to a portion of the first bellows, the elastic connection member being sealably connectable to the water outlet.

14. The drain hose of claim 12, wherein the second bellows comprises a discharge end which is insertable into the drain pipe.

15. The drain hose of claim 12, wherein the second end portion further comprises a cylindrical portion directly connected to the second bellows, the cylindrical portion having a discharge end which is insertable into the drain pipe.

16. The drain hose of claim 12, wherein the second end portion further comprises:

a cylindrical portion directly connected to the second bellows; and an elastic connection member integrally molded to the cylindrical portion, the elastic connection member being sealably connectable to the drain pipe.

17. The drain hose of claim 16, wherein the cylindrical portion of the second end portion comprises at least one annular ring externally formed thereon so as to prevent the molded elastic connection member from being disengaged from the second end portion.

18. The drain hose of claim 12, wherein the second end portion further comprises an elastic connection member integrally molded to a portion of the second bellows, the elastic connection member being sealably connectable to the drain pipe.

19. The drain hose of claim 12, wherein each of the first and second permanent bends is a 180 or 90 degree arc.

20. The drain hose of claim 12, wherein each of the first and second bellows comprises a plurality of folds and a profile of each of the plurality of folds comprises:

an inclined wall extending from a left lower point to a middle peak point; and a declined wall extending from the middle peak point to a right lower point, wherein a first angle formed between the inclined wall and a vertical axis passing through the middle top point is greater than a second angle formed between the vertical axis and the declined wall.

21. The drain hose of claim 12, wherein each of the first and second bellows is permanently expandable or retractable when a temporary pulling or pressing force is applied thereto.

22. A continuous drain hose for a cloth washing machine or a dish washer having a water outlet, the drain hose comprising:

a first end portion being connectable to the water outlet, the first end portion comprising a first bellows that is able to form a first permanent bend when a first temporary bending force is applied thereto;

a second end portion being connectable to a drain pipe, the second end portion comprising a second bellows that is able to form a second permanent bend when a second temporary bending force is applied thereto;

a third bellows that is able to be permanently expanded or retracted when a first temporary pulling or pressing force is applied thereto;

a first flexible corrugated portion connected between the first end portion and the third bellows;

a second flexible corrugated portion connected between the third bellows and the second end portion; and an elastic connection member integrally molded to the second end portion, wherein the first second end portion includes at least one annular ring which engages the elastic connection member, wherein said elastic connection member includes a plurality of ribs where a cross section of the plurality of ribs forms a cross.

23. The drain hose of claim 22, wherein the first end portion further comprises a cylindrical portion connected to the first bellows, the cylindrical portion being directly connectable to the water outlet.

24. The drain hose of claim 22, wherein the first end portion further comprises:

a cylindrical portion connected to the first bellows; and an elastic connection member integrally molded to the cylindrical portion, the elastic connection member being sealably connectable to the water outlet.

25. The drain hose of claim 24, wherein the cylindrical portion of the first end portion comprises at least one annular ring externally formed thereon so as to prevent the molded elastic connection member from being disengaged from the first end portion.

26. The drain hose of claim 22, wherein the first end portion further comprises an elastic connection member integrally molded to a portion of the first bellows, the elastic connection member being sealably connectable to the water outlet.

27. The drain hose of claim 22, wherein the second bellows comprises a discharge end which is insertable into the drain pipe.

28. The drain hose of claim 22, wherein the second end portion further comprises a cylindrical portion directly connected to the second bellows, the cylindrical portion having a discharge end which is insertable into the drain pipe.

29. The drain hose of claim 22, wherein the second end portion further comprises:

a cylindrical portion directly connected to the second bellows portion, and an elastic connection member integrally molded to the cylindrical portion, the elastic connection member being sealably connectable to the drain pipe.

30. The drain hose of claim 29, wherein the cylindrical portion of the second end portion comprises at least one annular ring externally formed thereon so as to prevent the molded elastic connection member from being disengaged from the second end portion.

31. The drain hose of claim 22, wherein the second end portion further comprises an elastic connection member integrally molded to a portion of the second bellows, the elastic connection member being sealably connectable to the drain pipe.

32. The drain hose of claim 22, wherein each of the first and second permanent bends is a 180 or 90 degree arc.

33. The drain hose of claim 22, wherein each of the first, second and third bellows comprises a plurality of folds and a profile of each of the plurality of folds comprises:

an inclined wall extending from a left lower point to a middle peak point; and a declined wall extending from the middle peak point to a right lower point, wherein a first angle formed between the inclined wall and a vertical axis passing through the middle top point is greater than a second angle formed between the vertical axis and the declined wall.

34. The drain hose of claim 22, wherein each of the first and second bellows is also permanently expandable or retractable when a second temporary pulling or pressing force is applied thereto.

35. The drain hose of claim 22, wherein the third bellows is able to form a third permanent bend when a third temporary bending force is applied thereto.

* * * * *